April 15, 1958     J. H. CARTER     2,830,640
TIRE CONSTRUCTION FOR WHEELED TOYS
Filed Nov. 28, 1955
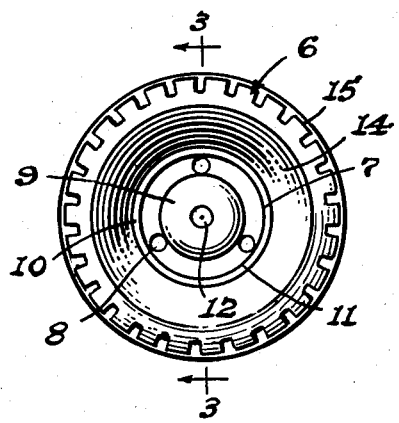
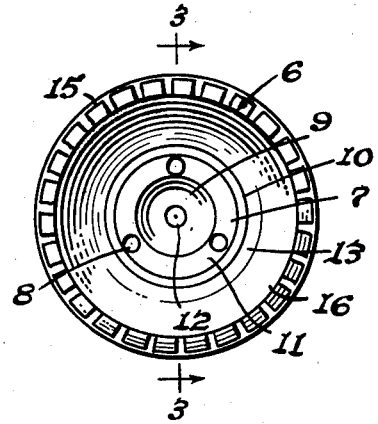
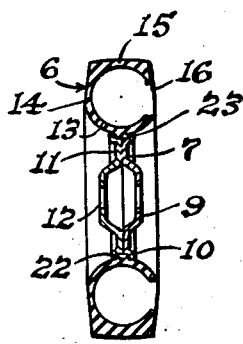
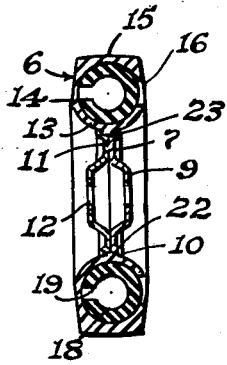
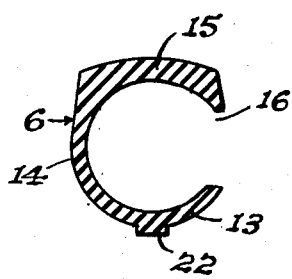
Inventor
Joseph H. Carter

2,830,640

TIRE CONSTRUCTION FOR WHEELED TOYS

Joseph H. Carter, Rockford, Ill., assignor to Carter Machine & Tool Co., Rockford, Ill., a corporation of Illinois Application November 28, 1955, Serial No. 549,263

1 Claim. (Cl. 152—312)

This invention relates to a new and improved hollow molded tire especially designed and intended for use on wheeled toys, such as toy automobiles, trucks, tractors, agricultural implements, and so forth, but believed to be also adapted for heavier duty uses if made of proportionately larger and heavier construction throughout.

The hollow tire of my invention is open circumferentially at one side, thereby providing a circumferentially extending inner wall for mounting on the rim of the wheel, integrally connected to a circumferentially extending outer or tread wall by a single circumferentially extending side wall, that is of arcuate cross-section and therefore well adapted to serve both as a yieldable resilient load support and shock absorber. Thus, when a fairly heavy toy equipped with such tires happens to be dropped the tires are well adapted to cushion the fall and thus reduce likelihood of breakage of the toy or bending of axles or steering spindles. Furthermore the larger size tire section, which the present improved construction makes practical, makes for better appearance without increase in cost and increase in weight, the tire weight being an important item in the cost of shipment of toys. Also, the hollow construction is of advantage over solid constructions in speeding up the curing time and accordingly reducing the cost of manufacture, besides simplifying the assembling of the tires onto the wheels, because of the increased stretch and resilience of the hollow section, the increased resilience also insuring better holding of the tires on the rims.

The present construction also has the advantage that a white or other contrasting color side wall effect is obtainable easily by merely inserting O-rings of white or other contrasting color molded rubber construction inside these hollow tires.

The invention is illustrated in the accompanying drawing, in which—

Figs. 1 and 2 are an outer and an inner side view of a tire made in accordance with my invention, shown applied to a wheel for a toy vehicle;

Fig. 3 is a cross-section on the line 3—3 of Figs. 1 and 2;

Fig. 4 is a cross-section like Fig. 3 showing a hollow O-ring inserted in the tire to give a white or other contrasting color side wall effect, the O-ring being hollow and open circumferentially on one side for reduced weight and cost and increased give and disposed with its open side toward the closed side wall of the tire, and Fig. 5 is an enlarged section of the tire.

The same reference numerals are applied to corresponding parts throughout the views.

Referring to the drawing, the reference numeral 6 designates the tire of my invention applied to a toy vehicle wheel 7 of suitable construction, that herein shown being made of two circular sheet metal stampings spot-welded together at three equally circumferentially spaced points 8 between the hub 9 and rim or felly 10 where the inwardly dished portions 11 of the stampings have abutment annularly of the wheel. The coaxially aligned center holes 12 in the outwardly dished hub portions 9 of the two wheel parts are adapted to receive an axle.

The tire 6 is molded in one piece of rubber or other resilient material and is of hollow ring form providing an inner circumferentially extending wall 13 integrally connected at one side by a circumferentially extending side wall 14 with the circumferentially extending outer or tread wall 15, leaving one side of the tire open circumferentially, as appears at 16. When the tire 6 is used, as is, the open side 16 is on the inner side of the wheel. On the other hand, when an O-ring 17 molded of white rubber or other contrastingly colored resilient material is inserted in the tire 6, as shown in Fig. 4, to give similar to a white side-wall effect, the open side 16 is, of course, on the outer side of the wheel. The side wall 14 is thick enough to be more than adequate to support the anticipated load, it being approximately double the thickness of what would be provided for each side of the tire if there were side walls on both sides of the tire. The arcuate form of the side wall 14 helps to provide the desired amount of bounce or springlike action so as to absorb the shock if the toy on which the tire is used happens to be dropped, the shock absorbing action of these tires being enough usually to prevent breakage of the toy or even bending of the axles or steering spindle. When inserts 17 are used these are preferably molded of hollow form, as indicated at 18 in Fig. 4, and made with one side left open circumferentially, as indicated at 19, the latter disposed toward the inside of side wall 14, as shown.

The inner wall 13 has at the middle of its radially inner side an annular bead or rib 22 which fits in the annular channel 23 defined in the felly or rim portion 10 for good anchorage of the tire on the wheel.

It is believed the foregoing description conveys a good understanding of the objects and advantages of my invention. The appended claim has been drawn to cover all legitimate modifications and adptations.

I claim:

A tire comprising a one-piece hollow ring-shaped body of resilient material providing radially spaced circumferentially extending inner and outer walls integrally connected by only one circumferentially extending substantially radial side wall disposed on one side of a median plane through said tire, the other side of said tire being open circumferentially, said inner wall being adapted to be engaged on the rim of a wheel for support of the tire thereon, and said outer wall constituting the tread portion of the tire, and a filler ring of compressible resilient material inserted into said tire through the open side thereof, said filler ring being also of hollow construction for increased yieldability and less weight, said filler ring being open circumferentially on one side and having the open side in toward the side wall of the tire.

References Cited in the file of this patent

UNITED STATES PATENTS

| 1,137,124 | Drabold et al. | Apr. 27, 1915 |
| 2,701,971 | Carter et al. | Feb. 15, 1955 |

FOREIGN PATENTS

| 5,836 | France | Apr. 3, 1906 |

(1st Addition to Patent No. 355,649)